ated Jan. 18, 1972

United States Patent Office

3,636,015
Patented Jan. 18, 1972

3,636,015
PREPARATION OF THIONAMIDES
Patricia M. Scanlon, Arlington, Mass., and Elwyn R. Young, Nashua, N.H., assignors to W. R. Grace & Co., New York, N.Y.
No Drawing. Filed Oct. 14, 1968, Ser. No. 767,517
Int. Cl. C07c 103/44, 121/20, 153/05
U.S. Cl. 260—402.5    11 Claims

ABSTRACT OF THE DISCLOSURE

In abstract, this invention is directed to thionamides having the formulas:

$$(NC-CH_2)_2=N-CH_2-\overset{S}{\overset{\|}{C}}-NH_2, \quad N\equiv(CH_2-\overset{S}{\overset{\|}{C}}-NH_2)_3$$

$$(H_2N-\overset{S}{\overset{\|}{C}}-CH_2)_2=N-CH_2CH_2-N=(CH_2-\overset{S}{\overset{\|}{C}}-NH_2)_2$$

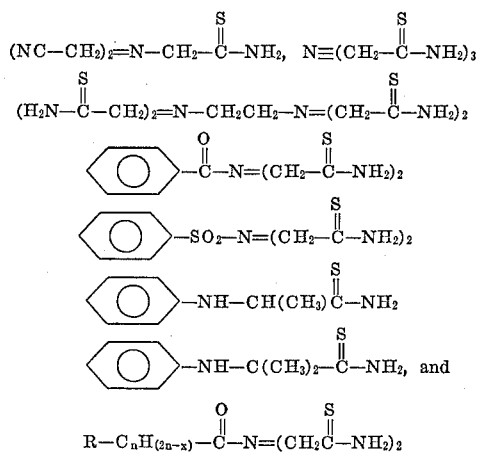

$$R-C_nH_{(2n-x)}-\overset{O}{\overset{\|}{C}}-N=(CH_2\overset{S}{\overset{\|}{C}}-NH_2)_2$$

wherein R is a member selected from the group consisting of —H and —CH$_3$, $n$ is 1–16, and $x$ is 0 or 2, and to the preparation of such thionamides, all as recited hereinafter.

BACKGROUND OF THE INVENTION

This invention is in the field of thionamides and the preparation of thionamides.

Prior art methods for preparing thionamides are taught by U.S. Pats. Nos. 2,168,847 and 2,201,170.

SUMMARY OF THE INVENTION

In summary, this invention is directed to a thionamide selected from the group consisting of:

$$(NC-CH_2)_2=N-CH_2-\overset{S}{\overset{\|}{C}}-NH_2, \quad N\equiv(CH_2-\overset{S}{\overset{\|}{C}}-NH_2)_3$$

$$(H_2N-\overset{S}{\overset{\|}{C}}-CH_2)_2=N-CH_2CH_2-N=(CH_2-\overset{S}{\overset{\|}{C}}-NH_2)_2$$

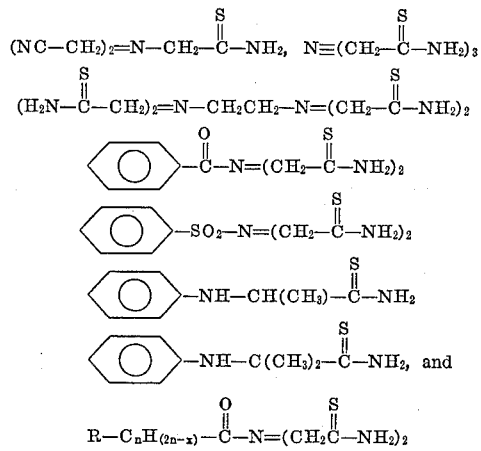

$$R-C_nH_{(2n-x)}-\overset{O}{\overset{\|}{C}}-N=(CH_2\overset{S}{\overset{\|}{C}}-NH_2)_2$$

wherein R is a member selected from the group consisting of —H and —CH$_3$, $n$ is 1–16, and $x$ is a member selected from the group consisting of 0 and 2 (i.e., $x$ can be 0 or $x$ can be 2).

DESCRIPTION OF PREFERRED EMBODIMENTS

In a preferred embodiment of the invention set forth in the above summary, this invention is directed to a thionamide selected from the group consisting of:

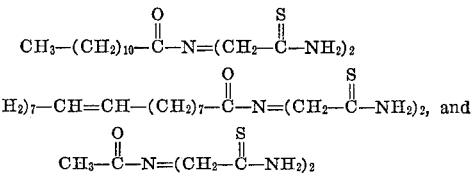

$$CH_3-(CH_2)_7-CH=CH-(CH_2)_7-\overset{O}{\overset{\|}{C}}-N=(CH_2-\overset{S}{\overset{\|}{C}}-NH_2)_2, \text{ and}$$

$$CH_3-\overset{O}{\overset{\|}{C}}-N=(CH_2-\overset{S}{\overset{\|}{C}}-NH_2)_2$$

In another preferred embodiment ("Embodiment A") this invention is directed to a process for preparing a thionamide selected from the group consisting of:

$$H-N=(CH_2-\overset{S}{\overset{\|}{C}}-NH_2)_2 \quad N\equiv(CH_2-\overset{S}{\overset{\|}{C}}-NH_2)_3$$

$$(NC-CH_2)_2=N-CH_2-\overset{S}{\overset{\|}{C}}-NH_2.$$

$$(H_2N-\overset{S}{\overset{\|}{C}}-CH_2)_2=N-CH_2CH_2-N=(CH_2-\overset{S}{\overset{\|}{C}}-NH_2)_2$$

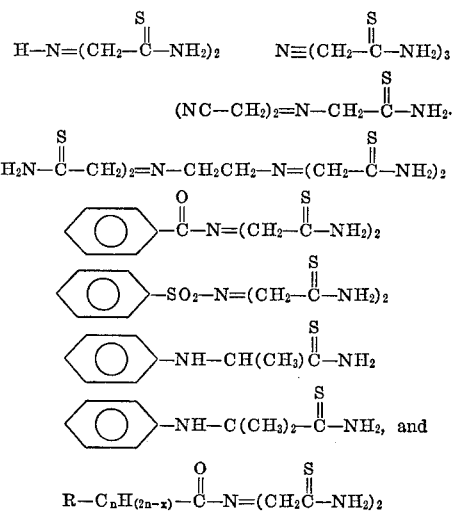

$$R-C_nH_{(2n-x)}-\overset{O}{\overset{\|}{C}}-N=(CH_2\overset{S}{\overset{\|}{C}}-NH_2)_2$$

wherein R is a member selected from the group consisting of —H and —CH$_3$, $n$ is 1–16, and $x$ is 0 or 2, comprising:

(a) Preparing a first mixture by mixing (i) an inert solvent selected from the group consisting of dimethylformamide and dimethyl sulfoxide; (ii) a nitrile selected from the group consisting of:

H—H=(CH$_2$CN)$_2$
N≡(CH$_2$CN)$_3$
(NCCH$_2$)$_2$=N—CH$_2$CH$_2$—N=(CH$_2$CN)$_2$

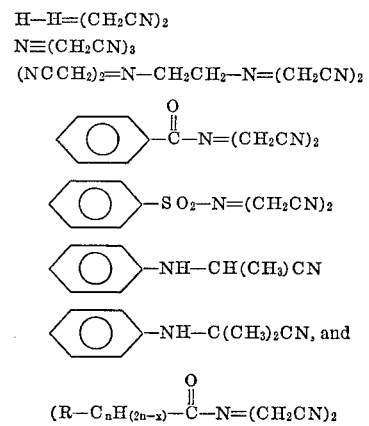

$$(R-C_nH_{(2n-x)}-\overset{O}{\overset{\|}{C}}-N=(CH_2CN)_2$$

(iii) ammonia, and (iv) hydrogen sulfide, the mole ratio of nitrile to ammonia being about 1:1–3, the hydrogen sulfide being supplied in a ratio of at least about 1 mole of hydrogen sulfide per equivalent of nitrile being reacted (i.e., for each equivalent (ca. 26.03 parts) of —CN which is being reacted), the nitrile being supplied at a rate of about 1 gram of nitrile per 2–10 grams of reaction medium;

(b) Reacting the first mixture and converting said mixture to a second mixture containing the thionamide as a reaction product by allowing the first mixture to stand for at least about 4 hours at about −5° C. to +30° C. (preferably for not more than about 30 hours and preferably for not more than about 24 or for 8–24 hours);

(c) Separating the thionamide from the second mixture and recovering the separated thionamide. (If desired, the separated thionamide can be washed with water, or dried, or washed with water and dried before being recovered.)

In especially preferred embodiments of the process set forth in Embodiment A, supra:

(1) The nitrile is selected from the group consisting of $$CH_3-(CH_2)_{10}-\overset{O}{\overset{\|}{C}}-N=(CH_2CN)_2$$

$$CH_3-(CH_2)_7-CH=CH-(CH_2)_7-\overset{O}{\overset{\|}{C}}-N=(CH_2-CN)_2, \text{ and}$$

$$CH_3-\overset{O}{\overset{\|}{C}}-N=(CH_2CN)_2$$

and the thionamide is selected from the group consisting of $$CH_3-(CH_2)_{10}-\overset{O}{\overset{\|}{C}}-N=(CH_2-\overset{S}{\overset{\|}{C}}-NH_2)_2$$

$$CH_3(CH_2)_7-CH=CH-(CH_2)_7-\overset{O}{\overset{\|}{C}}-N=(CH_2-\overset{S}{\overset{\|}{C}}-NH_2)_2, \text{ and}$$

$$CH_3-\overset{O}{\overset{\|}{C}}-N-(CH_2-\overset{S}{\overset{\|}{C}}-NH_2)_2$$

(2) The first mixture is allowed to stand for about 8–24 hours at about 15–30° C., thereby to form the second mixture;

(3) A precipitate of crude thionamide and a mother liquor are formed by admixing the second mixture with water, the water being supplied at a rate of about 5–50 (preferably 10–30 parts) per part of the second mixture, and the precipitated crude thionamide is separated from the mother liquor (e.g., by filtration, centrifugation, or decantation);

(4) The mole ratio of nitrile to ammonia is about 1:2;

(5) The inert solvent is dimethylformamide;

(6) The separated crude thionamide is washed with water until it is substantially free of inert solvent or mother liquor where water was used to precipitate the thionamide (i.e., until the washed separated thionamide contains less than about 0.5% and preferably less than about 0.1% inert solvent or mother liquor); and (7) The washed thionamide is dried at about 20–60° C. under a pressure of about 5–760 millimeters absolute pressure until substantially dry before being recovered.

In another preferred embodiment ("Embodiment B") the instant invention is directed to a process for preparing a thionamide selected from the group consisting of $$H-N=(CH_2-\overset{S}{\overset{\|}{C}}-NH_2)_2$$

$$N\equiv(CH_2-\overset{S}{\overset{\|}{C}}-NH_2)_3$$

$$(NC-CH_2)_2=N-CH_2-\overset{S}{\overset{\|}{C}}-NH_2$$

$$(H_2N-\overset{S}{\overset{\|}{C}}-CH_2)_2=N-CH_2CH_2-N=(CH_2-\overset{S}{\overset{\|}{C}}-NH_2)$$

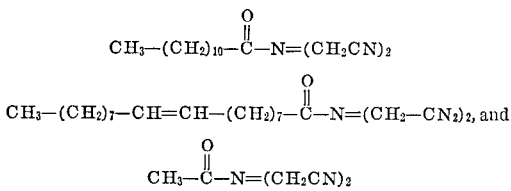

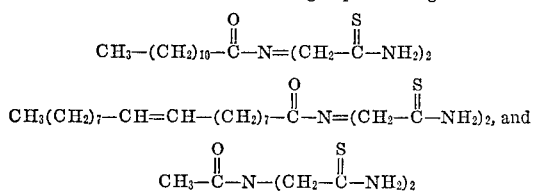

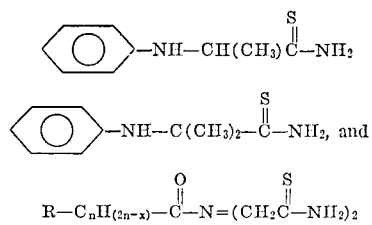

wherein R is a member selected from the group consisting of —H and —CH$_3$, $n$ is 1–16, and $x$ is a member selected from the group consisting of 0 and 2 (i.e., $x$ is 0 or 2), comprising:

(a) Preparing a reaction mixture consisting essentially of (i) an inert liquid reaction medium selected from the group consisting of dimethylformamide and dimethyl sulfoxide; (ii) a nitrile selected from the group consisting of:

$$H-N=(CH_2CN)_2$$

$$N\equiv(CH_2CN)_3$$

$$(NCCH_2)_2=N-CH_2CH_2-N=(CH_2CN)_2$$

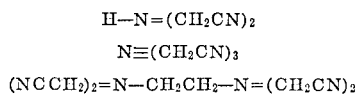

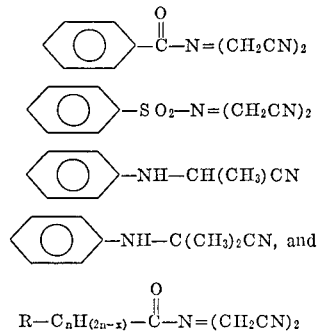

$$R-C_nH_{(2n-x)}-\overset{O}{\overset{\|}{C}}-N=(CH_2CN)_2$$

wherein R is a member selected from the group consisting of —H and —CH$_3$, $n$ is 1–16, and $x$ is 0 or 2, (III) ammonia, and (iv) hydrogen sulfide, the mole ratio of nitrile to ammonia being about 1:1–3, the hydrogen sulfide being supplied in a ratio of at least about 1 mole of hydrogen sulfide per equivalent of nitrile being reacted. (As shown supra, an equivalent of nitrile is that quantity of nitrile which contains one —CN group. In the instance of a dinitrile such as H—N≡(CH$_2$CN)$_2$ an equivalent of the nitrile is ½ mole, in the instance of a trinitrile such as N≡(CH$_2$CN)$_3$ it is ⅓ mole, and in the instance of a tetranitrile such as ethylenediaminetetraacetonitrile an equivalent is ¼ mole of the nitrile.) The weight ratio of nitrile to inert reaction medium being about 1:0.5–10 (preferably about 1:1–5);

(b) Forming a reacted mixture consisting essentially of the thionamide, the inert reaction medium, and ammonia (with any unreacted H$_2$S or other unreacted reactant or by-product also being present) by maintaining the reaction mixture at about −5° to +30° C. (preferably about 0–20° C.) for about 4–24 (preferably at least 8 hours);

(c) Forming a precipitate consisting essentially of the thionamide and a mother liquor by mixing the reacted mixture with water. (Obviously, the precipitated thionamide is highly contaminated with mother liquor.) The weight ratio of reacted mixture to water being about 1:5–50 (preferably about 1:10–30);

(d) Separating the precipitated thionamide from the mother liquor (e.g., by decantation, filtration, or centrifugation);

(e) Washing the separated thionamide with water until the washed separated thionamide is substantially free of mother liquor (i.e., until the thionamide is contaminated with less than about 0.5% and preferably less than about 0.1% mother liquor);

(f) Drying the washed thionamide at about 20–110° C. and about 5–760 millimeters of mercury absolute pressure until the thionamide is substantially dry (i.e., until the thionamide contains less than about 2% and preferably less than 0.5% of the inert solvent); and (g) Recovering the substantially dry thionamide. (If desired, the washing step, or the drying step can be omitted and the crude, or wet, or crude and wet thionamide can be recovered—crude thionamide being thionamide contaminated with an appreciable quantity, e.g., more than 0.5% of the mother liquor from which it (the thionamide) was precipitated. The thionamide can be air-dried, or dried in a drying apparatus (e.g., a pressure of about 5–600 millimeters of mercury absolute pressure).)

DETAILED DESCRIPTION OF THE INVENTION

In conducting the process of this invention we generally prefer to use dimethylformamide (DMF) as the inert solvent in which the reactants are reacted; however, we have obtained excellent results where using dimethyl sulfoxide (DMSO) as inert solvent. Also, we generally prefer to add the ammonia as ammonia vapor and the hydrogen sulfide as gaseous hydrogen sulfide. However, we have obtained excellent results where using liquid anhydrous ammonia and where using liquid hydrogen sulfide.

Although the reaction (or reactions) of our invention can be conducted at atmospheric pressure, or under reduced pressure (pressure less than atmospheric), or under superatmospheric pressure we generally prefer to add both the ammonia and the hydrogen sulfide under atmospheric pressure and to conduct the reaction at substantially atmospheric pressure because no substantial gain is achieved by using pressures other than atmospheric.

In conducting the process of our invention we dissolve the nitrile in the inert solvent (DMF or DMSO) and then add the ammonia and hydrogen sulfide. The order of addition of ammonia and the hydrogen sulfide is not critical. We generally prefer to add the ammonia and then the hydrogen sulfide; however, we have obtained excellent results where; (a) adding the hydrogen sulfide before adding the ammonia; and (b) adding the ammonia and hydrogen sulfide simultaneously.

We generally prefer to add about 1–3 moles of ammonia per mole of nitrile (preferably about 2 moles of ammonia per mole of nitrile).

We also prefer to add at least one mole of hydrogen sulfide for each equivalent of —CN being reacted. However, where reacting all the —CN groups of the nitrile, a larger quantity of hydrogen sulfide does no harm—except that it wastes hydrogen sulfide, and, because of the toxic nature of hydrogen sulfide, the unreacted hydrogen sulfide should be separated from any off-gas before such gas is vented to the atmosphere.

After the mixture of reactants (nitrile, ammonia, and hydrogen sulfide) has reacted to form a reacted mixture containing the desired thionamide, the thionamide is separated from the major portion of inert solvent and any unreacted reactants present in the reacted mixture. We prefer to accomplish this by admixing the reacted mixture with water, thereby to precipitate the thionamide from a resulting mother liquor. We prefer to add the reacted mixture to the water because this procedure avoids the formation of lumps or chunks of the crude precipitated thionamide which occurs where water is added to the reacted mixture. However, we have obtained excellent results where adding the water to the reacted mixture. We then separate the precipitated thionamide from the mother liquor by such conventional techniques as filtration, decantation, or centrifugation.

As a consequence of our disclosure still other procedures for separating the thionamide from the thionamide-containing reacting mixture will be readily apparent to those skilled in the art. One such method comprises evaporating the inert liquid and an unreacted volatile reactants (or at least a major portion thereof) from the thionamide—preferably under reduced pressure.

We generally prefer to wash the separated thionamide until it is substantially free of mother liquor (or, where recovered by evaporating inert liquor and volatile material therefrom, until it is substantially free of any unreacted nonvolatile reactant, any unreacted volatile reactants, and any inert solvent which is not removed by the evaporation step) before recovering the separated thionamide. We also generally prefer to dry the washed separated (or the separated) thionamide before recovering it. The thionamide can be dried at any convenient temperature up to about 60° C.—suitably under reduced pressure.

Thionamides made by the process of this invention have been used with excellent results as flotation collectors where concentrating minerals by flotation. These thionamides have also been used with excellent results for rendering fabrics, paper, and other materials water repellent.

Our invention is further illustrated by the following specific but non-limiting examples.

EXAMPLE I

A 67-gram (g.) portion of NTAN (i.e., 0.5 mole NTAN) was added to a 500 ml. flask which contained 250 milliliters (ml.) of DMF. The flask and its contents were cooled to about 5° C. using an ice bath. Anhydrous ammonia vapor was passed into the liquid in the flask until about 10 g. (ca. 0.6 mole) was absorbed. Then hydrogen sulfide was added to the cooled (e.g., ca. 5° C.) liquid in the flask while stirring the liquid until a total of 69 g. (ca. 2 moles) of hydrogen sulfide was absorbed. The flask was stoppered and its contents were stirred overnight (ca. 15–16 hours). The resulting deep red liquid was then poured into a stirred 1700 ml. portion of cold (ca. 5–10° C.) water, whereby the thionamide product was precipitated. The precipitated thionamide was separated by filtration from the mother liquor from which it (the thionamide) had precipitated. The separated thionamide was washed with water while it (the separated thionamide) was on the filter. The thus washed thionamide was washed further by stirring with an 800-ml. portion of water at about 25° C., filtering, and washing, while on the filter, with about 800 ml. of water—the wash water being at about 25° C. The washed thionamide was air dried for about 5 days. The thus dried rust brown product was recovered, weighed (110.6 g. corresponding to a conversion of 93.6% based on the NTAN), and identified as nitrilotriacetothionamide,

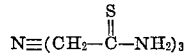

by its infrared spectrum and by elemental analysis.

Calculated for $C_6H_{12}N_4S_3$ (percent): C, 30.48; H, 5.12; N, 23.70; S, 40.69. Found (percent): C, 31.70; H, 5.08; N, 24.62; S, 38.70.

Substantially identical results were obtained when DMSO was substituted for the DMF.

Substantially identical results were also obtained where the mole ratio of NTAN to ammonia was about 1:2 (i.e., where using 0.5 mole of NTAN about 1.0 mole of $NH_3$ was added).

EXAMPLE II

The general procedure of Example I was repeated. However, in this instance only about ⅓ mole of hydrogen sulfide was added (i.e., the $H_2S$ was added at the rate of about ⅓ mole of $H_2S$ per equivalent of NTAN present). The product in this instance was identified by its infrared spectrum and elemental analysis.

Calculated for $C_6H_8N_4S$ (percent): C, 42.84; H, 4.79; N, 33.31; S, 19.06. Found (percent): C, 43.09; H, 4.95; N, 33.59; S, 19.11.

as N-thionacetamido-iminodiacetonitrile,

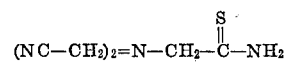

an off white solid melting at 168-171° C. (In this example only ⅓ of the —CN groups of the NTAN were reacted.)

EXAMPLE III

The general procedure of Example I was repeated. However, in this instance the NTAN was replaced with about 0.1 mole of EDTAN. Then 0.3 mole of ammonia was added and the resulting mixture was saturated with hydrogen sulfide. The hydrogen sulfide-saturated mixture was allowed to stand overnight and processed according to the general procedure of Example I. The resulting red product was identified by its infrared spectrum and elemental analysis Calculated for $C_{10}H_{20}N_5S_4$ (percent): C, 34.06; H, 5.67; N, 23.84; S, 36.38. Found (percent): C, 34.20; H, 5.83; N, 23.70; S, 36.23.

as ethylenediamine-N,N,N',N'-tetraacetothionamide,

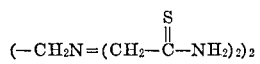

Conversion, based upon the EDTAN was 94% of theory.

EXAMPLE IV

Acetyliminodiacetothionamide,

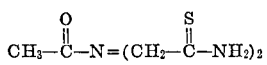

was prepared by the general procedure of Example I; however, in this instance acetyliminodiacetonitrile,

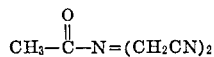

was used in place of NTAN. The product, acetyliminodiacetothionamide, was identified by its infrared spectrum and elemental analysis.

EXAMPLE V

Using the general procedure of Example I, six additional runs were made starting with 6 additional nitriles. The nitriles used and the products obtained are shown in the following table. In each instance the product was identified by its infrared spectrum and elemental analysis.

EXAMPLE VI

Iminodiacetothionamide,

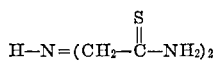

a know compound, was prepared by the general procedure of Example I using iminodiacetonitrile as the starting nitrile. The thionamide product was identified as iminodiacetothionamide by its melting point (124–127° C.), the fact that where mixed with an authentic sample of iminodiacetothionamide the product did not depress the melting point of said sample, and by comparing said product's infrared spectrum with that of an authentic sample.

As used herein the term "parts" means parts by weight unless otherwise defined where used and the term "percent (percent)" means parts per hundred by weight unless otherwise defined where used. Obviously, percent conversion is a dimensionless number.

As used herein, the term "by-product" includes by-products, side product, and side products unless otherwise defined where used.

As used herein "DMF" means dimethylformamide and "DMSO" means dimethyl sulfoxide.

As used herein "NTAN" means nitrilotriacetonitrile and "EDTAN" means ethylenediaminetetraacetonitrile.

Where pressures are reported in millimeters (or mm.) it is understood that such pressures are absolute pressures reported in millimeters of mercury.

We claim:

1. A thionamide having a formula selected from the group consisting of:

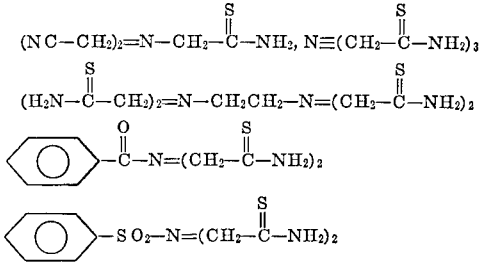

| Run No. | Nitrile | Name and formula of product | Color of product | Melting point of product, °C. | Analysis of product, percent (Theoretical values in parentheses) | | | |
|---|---|---|---|---|---|---|---|---|
| | | | | | C | H | N | S |
| 1 | N-lauroylimino-diacetonitrile. | N-lauroyliminodiacetothionamide $CH_3-(CH_2)_{10}-\overset{O}{\underset{\|}{C}}-N=(CH_2-\overset{S}{\underset{\|}{C}}-NH_2)_2$ | Pale yellow. | 137-139 | (55.61) 56.27 | (9.04) 9.04 | (12.16) 12.30 | (18.56) 18.52 |
| 2 | N-benzoylimino-diacetonitrile. | N-benzoyliminodiacetothionamide | White | 150-155 | (49.41) (49.23) | (4.90) 4.83 | (15.72) 15.64 | (23.98) 24.41 |
| 3 | N-oleoylimino-diacetonitrile. | N-oleoyliminodiacetothionamide $C_8H_{17}CH=CH-(CH_2)_7-\overset{O}{\underset{\|}{C}}-N=(CH_2-\overset{S}{\underset{\|}{C}}-NH_2)_2$ | Tan | 120-122 | (61.40) 61.76 | (9.48) 9.66 | (9.87) 9.82 | (15.29) 14.99 |
| 4 | N-benzenesulfonyl-iminodiacetonitrile. | N-benzenesulfonyliminodiacetothionamide | White | | (39.58) 39.32 | (4.32) 4.31 | (13.85) 13.78 | (31.70) 31.29 |
| 5 | 2-anilinopropionitrile. | 2-anilino-propionthioamide | ...do | | (59.96) 59.84 | (6.71) 6.82 | (15.54) 15.46 | (17.79) 17.97 |
| 6 | 2-anilino-2-methyl-propionitrile. | 2-anilino-2-methyl-propionthioamide | ...do | | (61.81) 61.69 | (7.26) 7.20 | (14.42) 14.29 | (16.50) 16.29 |

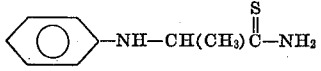

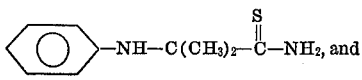

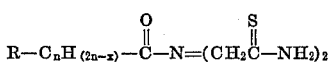

wherein R is a member selected from the group consisting of —H and —CH$_3$, $n$ is 1–16, and $x$ is a member selected from the group consisting of 0 and 2.

2. A thionamide of claim 1 wherein the formula is selected from the group consisting of:

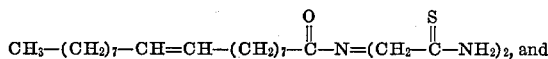

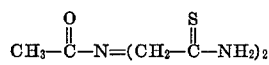

3. A process for preparing a thionamide having a formula selected from the group consisting of:

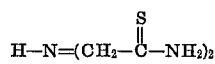

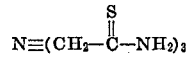

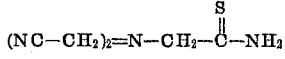

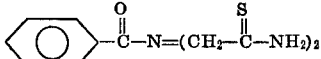

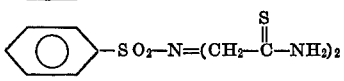

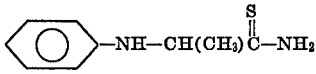

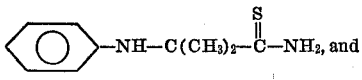

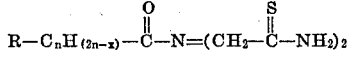

wherein R is a member selected from the group consisting of —H and —CH$_3$, $n$ is 1–16, and $x$ is a member selected from the group consisting of 0 and 2, comprising:

(a) preparing a first mixture by mixing (i) an inert solvent selected form the group consisting of dimethylformamide and dimethyl sulfoxide; (ii) a nitrile selected from the group consisting of:

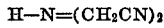
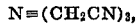
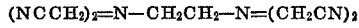

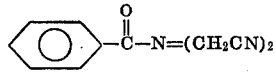

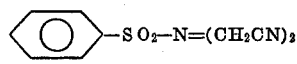

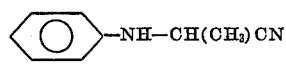

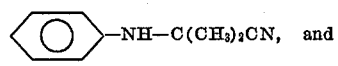

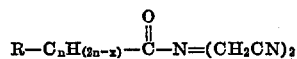

(iii) ammonia, and (iv) hydrogen sulfide, the mole ratio of nitrile to ammonia being about 1:1–3, the hydrogen sulfide being supplied in a ratio of at least about 1 mole of hydrogen sulfide per equivalent of nitrile being reacted, the nitrile being supplied at a rate of about 1 gram of nitrile per 2–10 grams of reaction medium;

(b) allowing the first mixture to stand for at least about 4 hours at about —5 to +30° C., thereby to form a thionamide solution;

(c) separating and recovering the thionamide from the thionamide solution.

4. The process of claim 3 wherein the nitrile has a formula selected from the group consisting of:

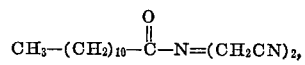

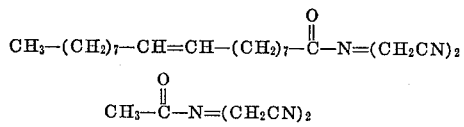

and the thionamide has a formula selected from the group consisting of:

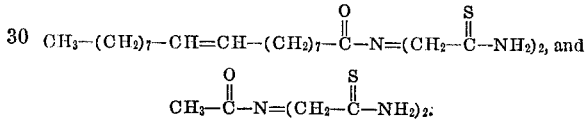

5. The process of claim 3 wherein the first mixture is allowed to stand for about 8–24 hours at about 15–30° C.

6. The process of claim 3 wherein a precipitate of crude thionamide and a mother liquor are formed by admixing the thionamide solution with water, the water being supplied at a rate of about 5–50 parts per part of the thionamide solution.

7. The process of claim 6 wherein the precipitated crude thionamide is separated, washed with water until substantially free of mother liquor, and recovered.

8. The process of claim 7 in which the washed thionamide is dried at about 20–60° C. under a pressure of about 5–760 millimeters of mercury absolute.

9. The process of claim 3 wherein the mole ratio of nitrile to ammonia is about 1:2.

10. The process of claim 3 wherein the inert solvent is dimethylformamide.

11. A thionamide having the formula

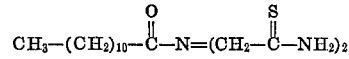

References Cited

UNITED STATES PATENTS 3,336,381   8/1967   Gilbert et al. _____ 260—551
3,346,632   10/1967  Tull et al. _____ 260—551

HENRY R. JILES, Primary Examiner

H. I. MOATZ, Assistant Examiner

U.S. Cl. X.R.

260—465.4, 465 DE, 551 S, 556 AR, 558 S, 561 S; 252—66; 161—182, 270; 2—87